(12) United States Patent
Gärtner

(10) Patent No.: US 7,478,722 B2
(45) Date of Patent: Jan. 20, 2009

(54) SYSTEM FOR TRANSPORTING COAT HANGERS

(76) Inventor: Franz Gärtner, Mühlweg 10, 97656 Oberelsbach (DE)

( * ) Notice: Subject to any disclaimer, the term of this patent is extended or adjusted under 35 U.S.C. 154(b) by 0 days.

(21) Appl. No.: 11/194,586

(22) Filed: Aug. 2, 2005

(65) Prior Publication Data

US 2006/0027441 A1    Feb. 9, 2006

(30) Foreign Application Priority Data

Aug. 4, 2004    (DE) .................... 10 2004 037 828

(51) Int. Cl.
 *B65G 33/00* (2006.01)
 *B65G 33/26* (2006.01)
(52) U.S. Cl. ................. 198/685; 198/678.1; 198/463.1; 198/793
(58) Field of Classification Search ................. 198/685, 198/678.1, 463.1, 793
 See application file for complete search history.

(56) References Cited

U.S. PATENT DOCUMENTS

| | | | | |
|---|---|---|---|---|
| 3,344,938 A | * | 10/1967 | Brooks | ................. 414/276 |
| 3,772,922 A | * | 11/1973 | Riggs | ............................ 74/25 |
| 3,845,855 A | * | 11/1974 | Schwarz et al. | ............. 198/685 |
| 5,456,346 A | * | 10/1995 | Schilling et al. | ............ 198/685 |
| 5,647,475 A | | 7/1997 | Gaertner | |
| 5,964,354 A | * | 10/1999 | Skinner | ...................... 209/3.3 |

FOREIGN PATENT DOCUMENTS

| | | |
|---|---|---|
| DE | 1229453 | 11/1966 |
| DE | 8716024 | 7/1988 |
| DE | 10146540 | 4/2003 |

\* cited by examiner

*Primary Examiner*—Gene O. Crawford
*Assistant Examiner*—Kavel P Singh
(74) *Attorney, Agent, or Firm*—Dykema Gossett PLLC

(57) ABSTRACT

The invention relates to a system for transporting coat hangers employing a conveyor screw capable of being driven about its longitudinal axis by a driving system. The conveyor screw is adapted to convey, in a direction of transport, hook coat hangers to be transported. The driving system is coupled to the front end of the conveyor screw, as regarded in the direction of transport.

23 Claims, 6 Drawing Sheets

SYSTEM FOR TRANSPORTING COAT HANGERS

BACKGROUND OF THE INVENTION

1. Field of the Invention

The invention relates to a system for transporting coat hangers.

2. The Prior Art

The prior art includes coat hanger transportation systems for hook coat hangers, comprising a screw conveyor driven rotatably about its longitudinal axis. Spirals of the screw conveyor interact with the hook arches of the coat hangers to be transported so that the coat hangers are moved in the direction of transport as the screw turns. A driving device for the screw conveyor is usually located at the rear end of the screw, outside the travel space of the coat hangers and the goods hanging thereon. The delivery of the coat hangers to the screw conveyor is usually accomplished with chutes that deliver the coat hangers to the transport rail in the rear region of the screw conveyor. In plan view, the chutes enclose a non-zero angle with the longitudinal axis of the screw, so that the coat hangers experience a change of direction when they are delivered onto the screw conveyor.

Such a coat hanger transportation system suffers from the drawback that the transfer from the chute onto the screw conveyor does not always function smoothly because of the required change of direction of the coat hangers and the goods hanging thereon. As a result, undesirable tailbacks and breakdowns occur.

It is an object of the invention to provide a system for transporting coat hangers with improved transfer reliability. It is a further object of the invention to provide a system for transporting coat hangers which is capable of conveying a large variety of hangers. Another object of the system of the invention is to make it possible to deliver the conveyed hangers in such a way that they are in line with the longitudinal axis of the screw conveyor as viewed from above.

SUMMARY OF THE INVENTION

According to the invention, this object is achieved by a coat hanger transportation system wherein a driving system is connected to the front end of the conveyor screw as seen in the direction of transport.

The invention will be explained below in greater detail by way of example with reference to the drawings.

DETAILED DESCRIPTION OF THE PREFERRED EMBODIMENT

Figure 1:
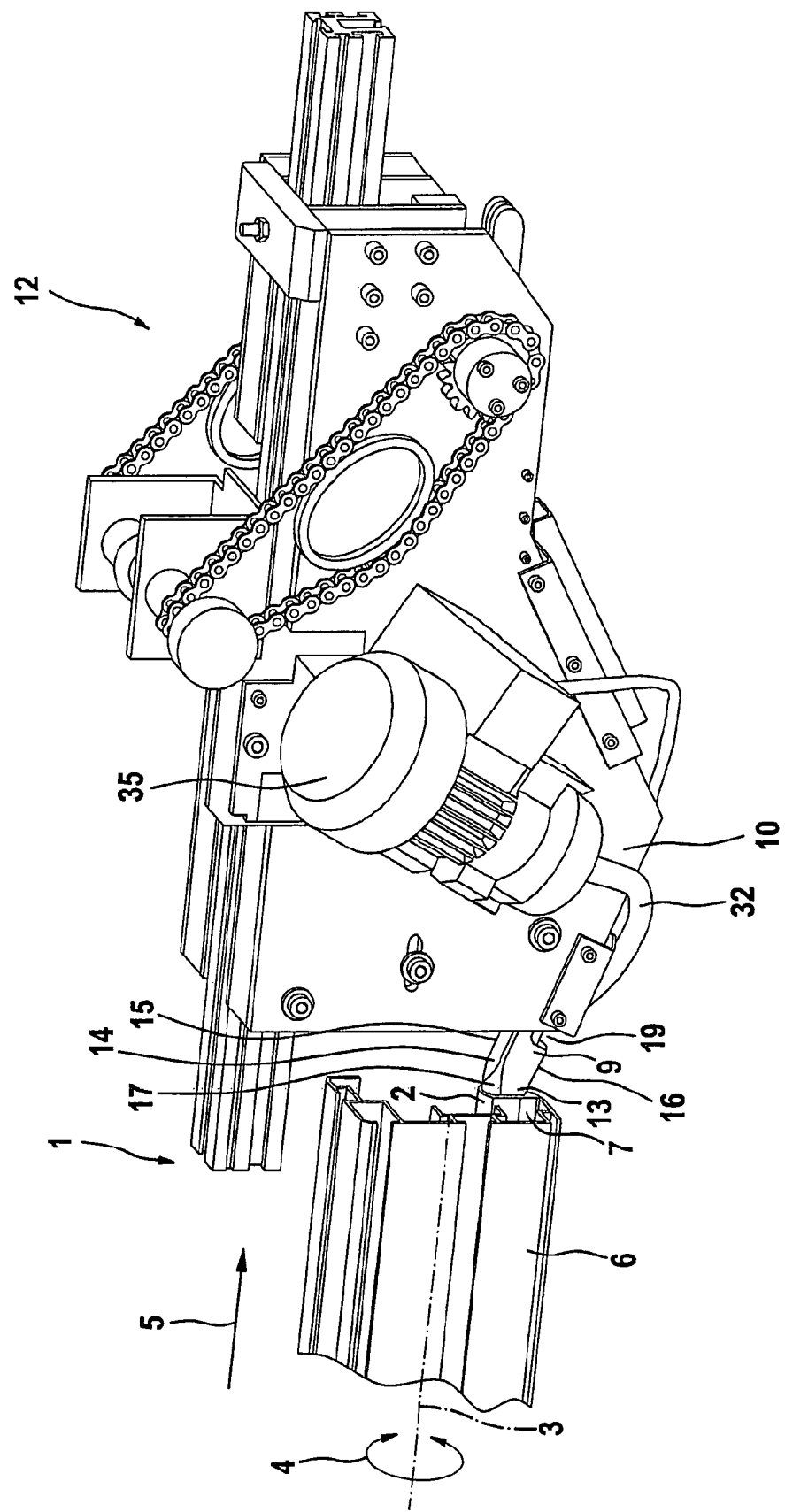
FIG. 1 is a perspective view of one embodiment of the coat hanger transportation system of the invention, with a view of the driving side.
Figure 6:
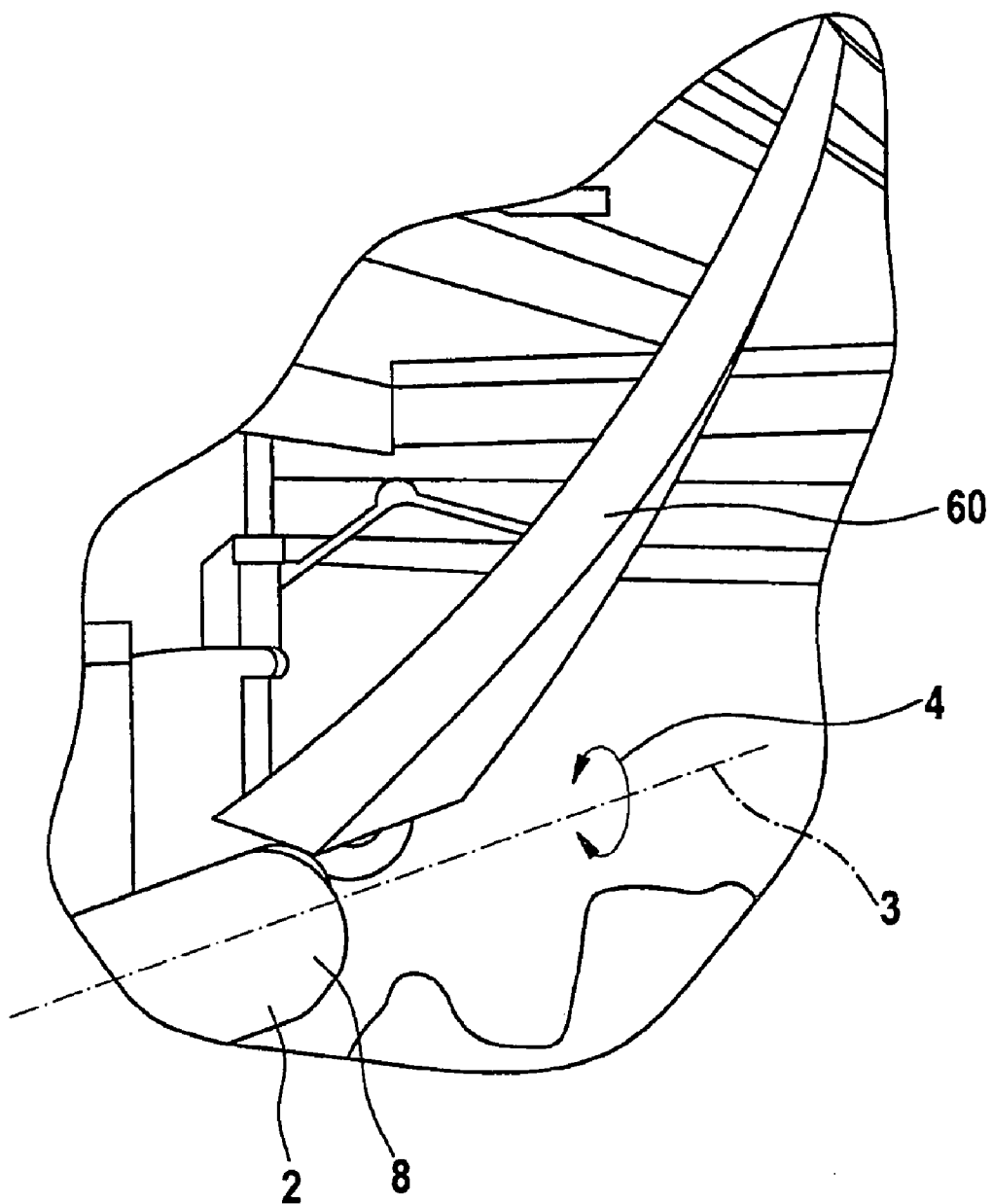
FIG. 6 is a view of the free end of the screw conveyor of the coat hanger transportation system in the region of the transfer chute of an ahead station.

A coat hanger transportation system of the invention 1 (FIGS. 1 to 3) comprises a screw conveyor 2 that is mounted for rotation about its longitudinal axis 3 in both directions as indicated by the double-headed arrow 4. Screw conveyor 2 is, for example, designed as a conveying screw or as a tailback screw and possesses screw spirals (not shown) which interact with the hook arches of the coat hangers in such a manner that the coat hangers can be moved in the direction of transport 5 as the screw conveyor 2 rotates about its longitudinal axis 3. Screw conveyor 2 is mounted for rotation within a suitable bearing rail 6, which is attached to a system frame by means of appropriate securing means (not shown). As seen in the direction of transport 5, screw conveyor 2 has a front end 7 and a free rear end 8 (see FIG. 6).

Figure 2:
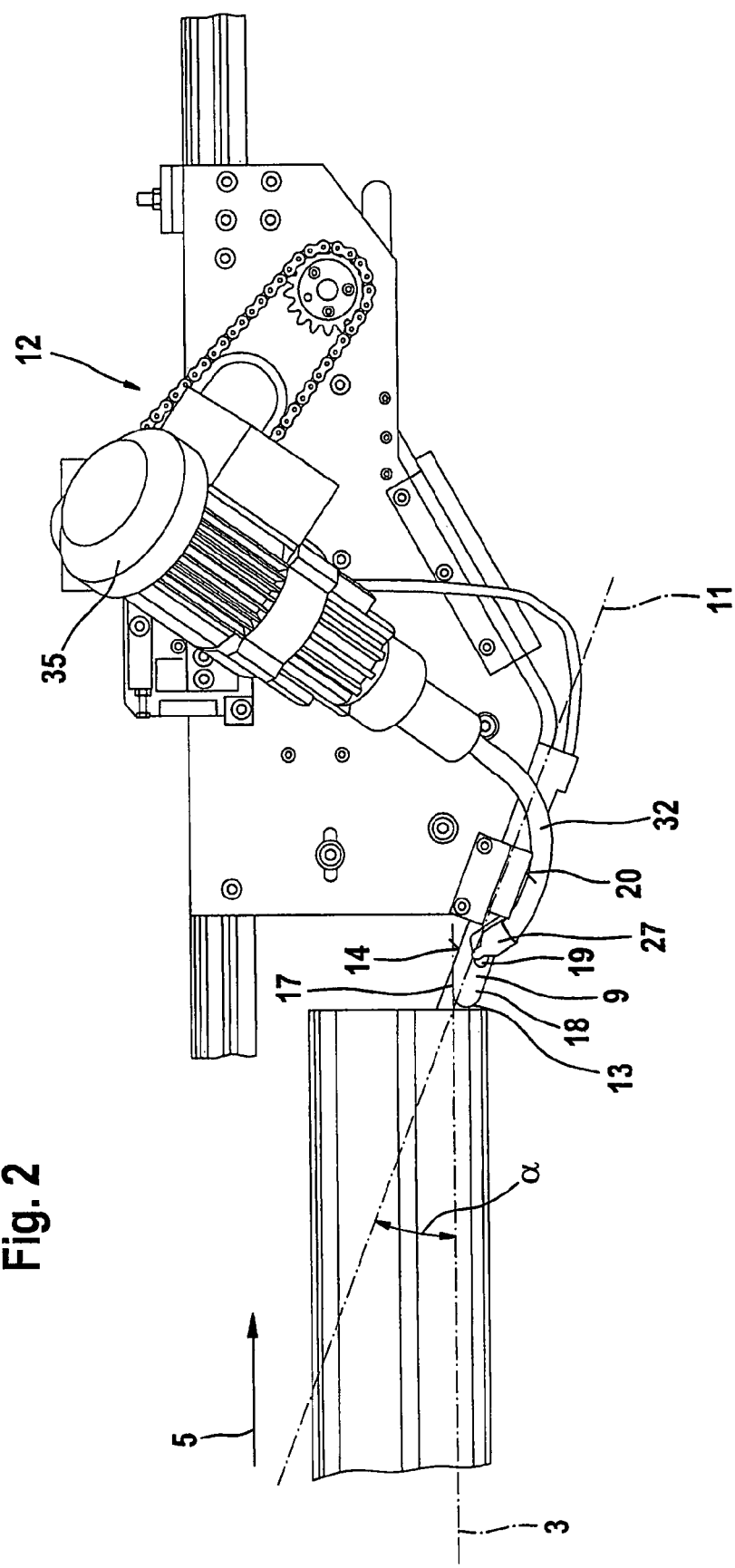
FIG. 2 is a side view of the coat hanger transportation system of the invention of FIG. 1, with a view of the driving side.
Figure 3:
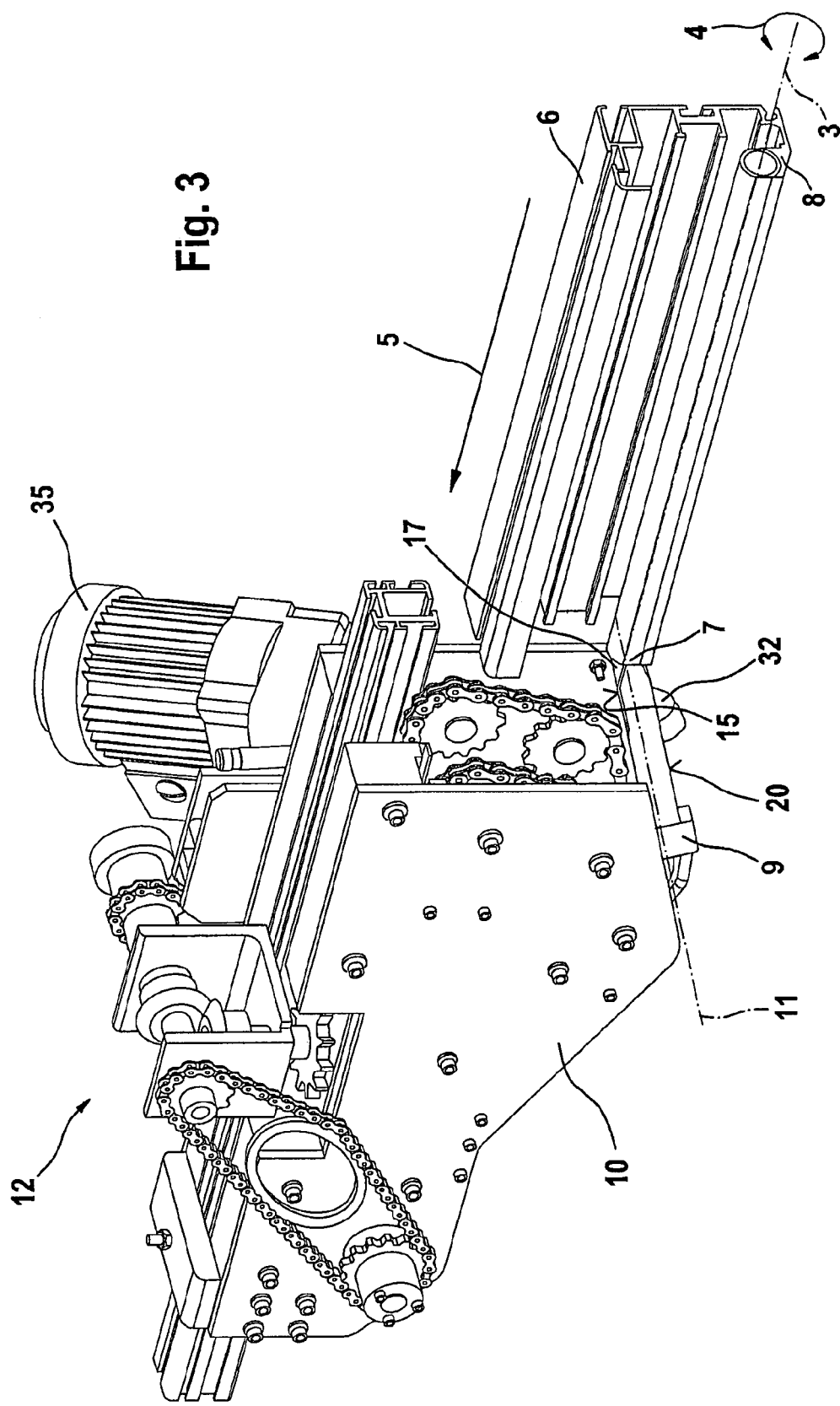
FIG. 3 is a perspective view of the coat hanger transportation device of FIGS. 1 and 2, with a view of the side opposite the driving side.

As seen in the direction of transport 5, a slide pole 9 (of FIGS. 1 and 2), which is immovably mounted on a cheek frame 10, follows directly on the front end 7 of screw conveyor 2. Slide pole 9 has a longitudinal axis 11 which encloses an angle α with longitudinal axis 3 of screw conveyor 2 as viewed from the side (FIG. 2). In plan view, the longitudinal axes 3 and 11 are in line so that they lie in a common vertical plane. The slide pole 9 delivers the hook hangers, e.g., coat hangers, to a singler 12 disposed downstream of the coat hanger transportation system. Such a singler is described in German Patent Application 10 2004 029448.8.

Slide pole 9 has a free end 13 to the rear, as regarded in the direction of transport 5, which free end 13 is disposed directly adjacent front end 7 of screw conveyor 2.

Slide pole 9 has a top surface 14, which is delimited by upper longitudinal edges 15 and 16. Upper longitudinal edges 15, 16 are provided with a chamfer 17 in the transition region leading to screw conveyor 2, so that the transfer of the coat hangers from screw conveyor 2 to slide pole 9 is as smooth and continuous as possible. Slide pole 9 has a window-like opening 19 in the region of one lateral surface 18, spaced at a short distance from free end 13 in the direction of transport 5, which opening 19 extends across part of lateral surface 18 and part of a bottom surface 20 of slide pole 9. Between opening 19 and the free end 13 of slide pole 9, the slide pole has a longitudinal bore 21, which has longitudinal axis 11 as its centerline. Longitudinal bore 21 opens into window-like opening 19 and is designed as a bearing seat 22 in the subregion between open end 13 and window-like opening 19, eg to serve as a force fit for antifriction bearings (see FIG. 10).

Figure 7:
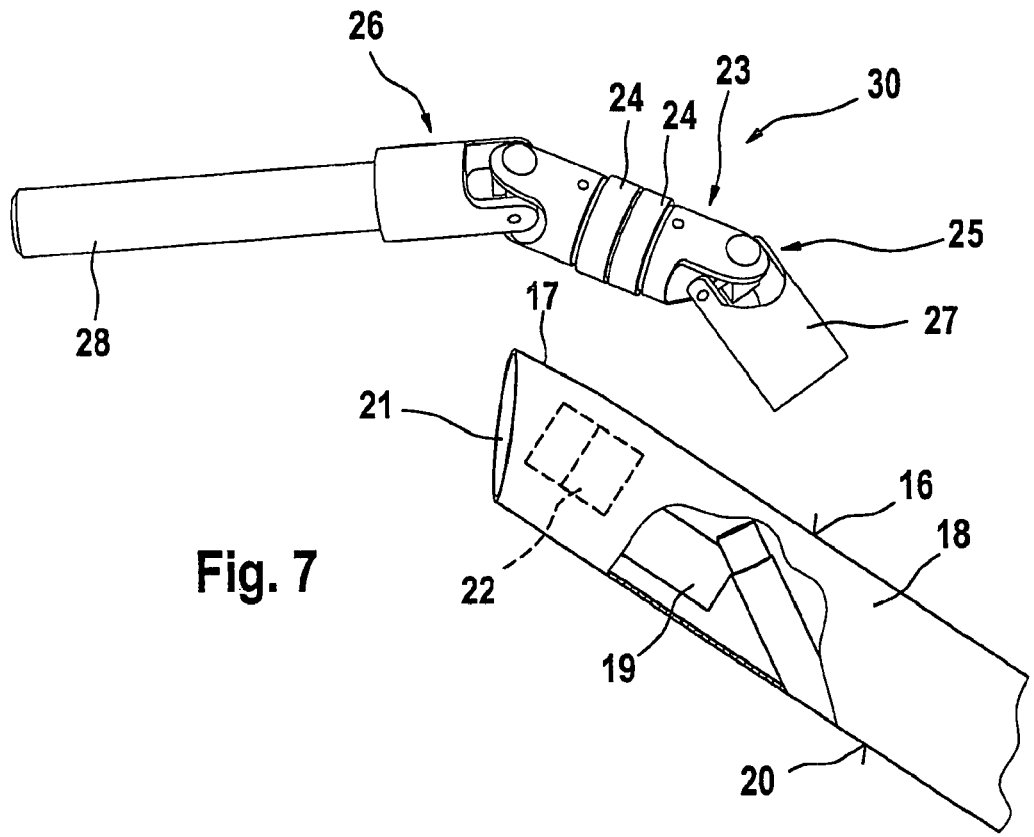
FIG. 7 is an exploded view of components of the coat hanger transportation system of the invention.

Bearing seating 22 serves as a rotational mount for a drive shaft 23 (see FIG. 7) and is equipped with antifriction bearings 24 for this purpose. Shaft 23 has a first universal joint system 25 and a second universal joint system 26 at each of its free ends. The first universal joint system 25 is positioned in the window-like opening 19 with its free joint end 27 and thus forms an extension of slide pole 9. The second universal joint system 26 is connected to an adapter pole 28, which is mounted within screw conveyor 2 and non-rotatably linked thereto. Thus it is possible to transmit a driving rotary movement to screw conveyor 2 via the first universal joint system 25, shaft 23, the second universal joint system 26, and adapter pole 28.

Thus, according to the invention, screw conveyor 2 can be rotated at its front end, as seen in the direction of transport 5.

Figure 8:
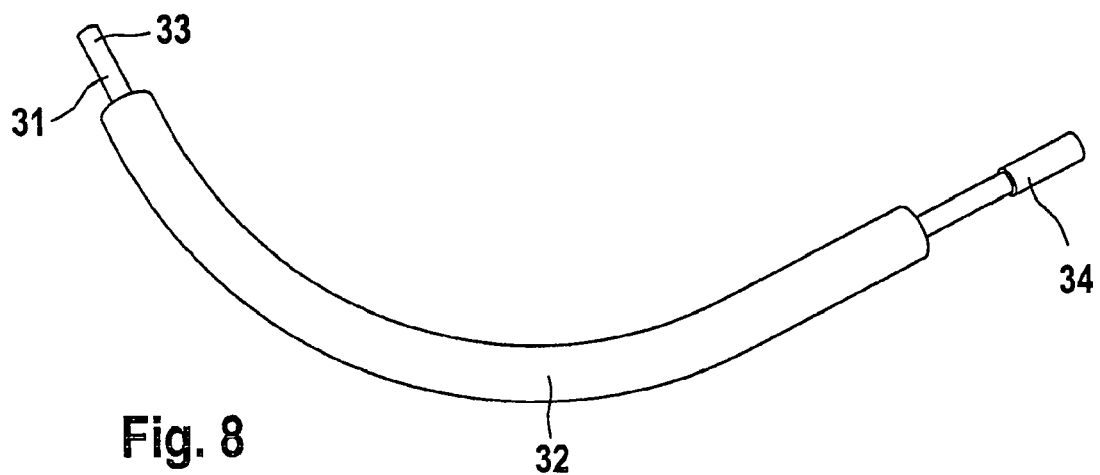
FIG. 8 is a view of a drive transmission unit of the coat hanger transportation system of the invention.

The first universal joint system 25, shaft 23, the second universal joint system 26, and adapter pole 28 form a drive transmission unit 30 which is connected to a flexible shaft 31 (see FIG. 8) in the region of the free joint end 27 of the universal joint system 25 (see FIG. 2).

Flexible shaft 31 extends through a curved rigid sleeve 32 and is mounted for rotation therein. The first end 33 of the flexible shaft 31 is connected to the free end 27 of universal joint system 25 during assembly. The second free end 34 of flexible shaft 31 is connected to a driving motor 35.

Thus, with a coat hanger transportation system of to the invention, screw conveyor 2 can be driven at its front end, as seen in the direction of transport 5, by means of drive line 30, 31 which is curved relative to longitudinal axis 3 of screw conveyor 2 and/or angled relative to longitudinal axis 11 of slide pole 9 and is formed by drive transmission unit 30 and flexible shaft 31.

The course of the curved and/or angled drive line of screw conveyor 2 is selected such that unhindered passage is assured in the direction of transport 5 for all of the hook coat hangers that have to be transported, with their various hook arch geometries and various hanger geometries.

Figure 5:
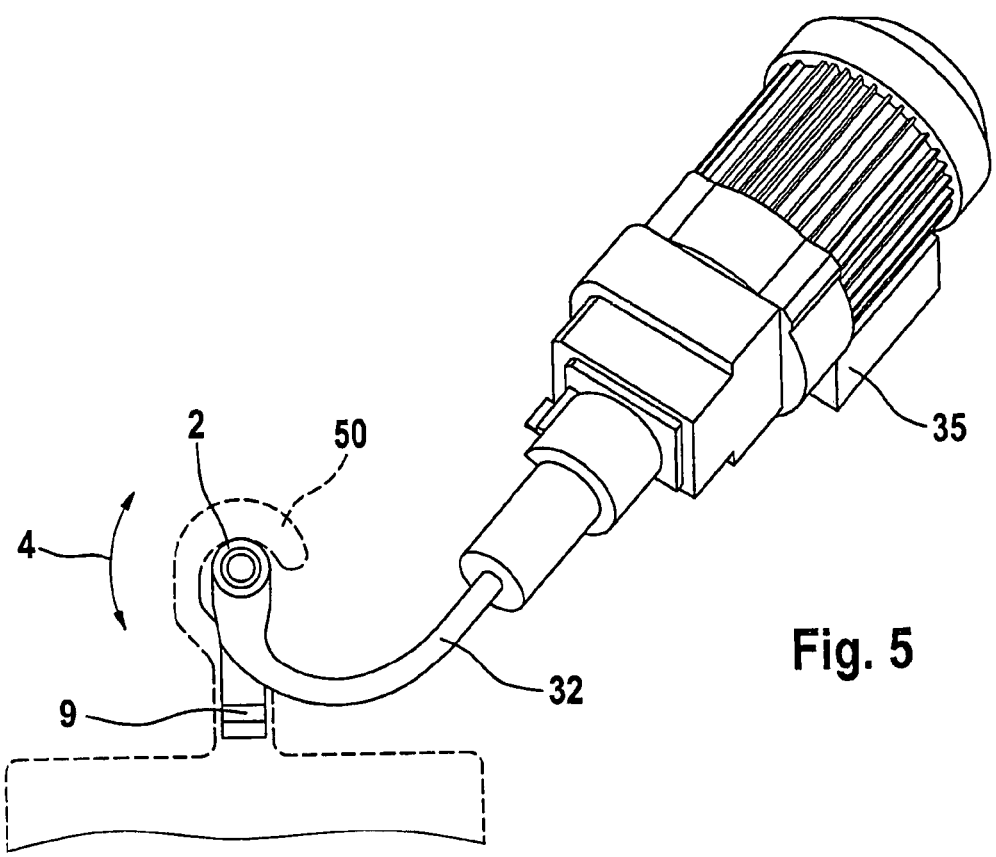
FIG. 5 shows diagrammatically a detail representation of the coat hanger transportation system of the invention as viewed in the direction of transport.

To this end, the free end of drive transmission unit 30, i.e. the free end 27 of the first universal joint system 25, as regarded in the direction of transport 5 through the coat hanger transportation system of the invention, is initially aligned laterally downwardly toward that side to which the openings formed by the hook arches of the conveyed coat hangers point (see FIG. 5).

Figure 4:
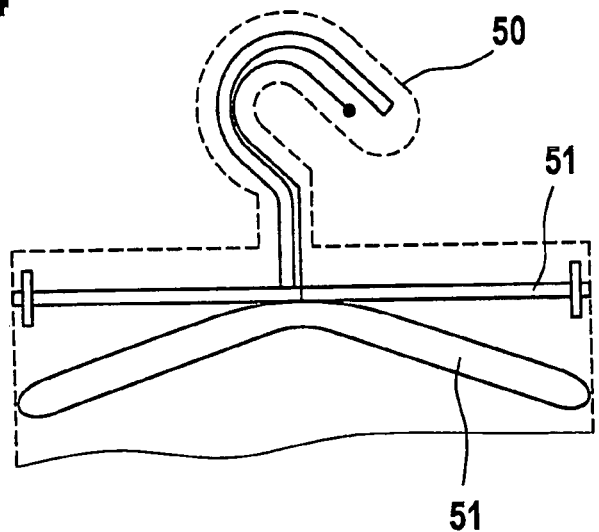
FIG. 4 shows diagrammatically various superimposed coat hangers for explanation of the term "envelope horizon"

The course of the entire drive line except for slide pole 9 is conveniently selected such that none of the components of the drive line lies within an envelope horizon 50 (see FIG. 4) of all of the coat hangers 51 to be transported. The envelope horizon 50 is an imaginary envelope surface encompassing all of the coat hangers that might have to be transported and thus represents a dummy for the maximum construction space required, along the path of transportation 5, for the coat hangers to be transported. The envelope horizon 50 also advantageously allows for those different positions of individual coat hangers as are caused, for example, by the items suspended on the coat hangers swinging about longitudinal axis 3 and/or longitudinal axis 11. In addition, the space that is needed because of rotation or swiveling of the coat hangers about, say, a vertical axis of the coat hangers is advantageously also allowed for within the envelope horizon 50. Any collision of any coat hanger with the drive line of the coat hanger transportation system of the invention is reliably prevented when the course of the drive line is safely outside the envelope horizon 50 in every operational situation.

It is of particular advantage with the coat hanger transportation system 1 of the invention that the delivery of hook coat hangers can take place from an ahead station in a transportation facility, for example downwardly from a higher position by means of a chute 60 (see FIG. 6) in a particularly reliable and, as regards construction effort, simple manner, in alignment with longitudinal axis 3 of screw conveyor 2, as viewed from above. Thus, a high degree of reliability in operation and low occurrence of down time when operating the coat hanger transportation system of the invention are ensured.

The invention claimed is:

1. A system for transporting coat hangers which comprises:
   a slide pole which has a window-like opening in a region of one lateral surface, spaced a short distance from a free end in a direction of transport, which opening extends across part of a lateral surface and part of a bottom surface of said slide pole,
   a conveyor screw which has a front end adjacent said slide pole and which is rotatable about a longitudinal axis to transport coat hangers along said conveyor screw in said direction of transport and onto the slide pole, and
   a driving system for rotating said conveyor screw, said driving system including a drive transmission unit mounted in said slide pole and coupled to said front end of said conveyor screw.

2. A system for transporting coat hangers as defined in claim 1, wherein said drive transmission unit includes a universal joint shaft having a shaft and at least one universal joint system.

3. A system for transporting coat hangers as defined in claim 1, wherein said conveyor screw is a tailback screw.

4. A system for transporting coat hangers as defined in claim 1, including a bearing rail supporting said conveyor screw for rotation about the longitudinal axis thereof in the direction of a double-headed arrow.

5. A system for transporting coat hangers as defined in claim 1, wherein said conveyor screw has a front end and a rear free end, as seen in the direction of transport.

6. A system for transporting coat hangers as defined in claim 1, wherein said slide pole is immovably mounted on a cheek frame and follows directly on said conveyor screw at its front end, as seen in the direction of transport.

7. A system for transporting coat hangers as defined in claim 1, wherein said slide pole is mounted so as to define a longitudinal axis which encloses an angle a with the longitudinal axis of said conveyor screw, in side view.

8. A system for transporting coat hangers as defined in claim 7, wherein the longitudinal axes are in line with each other, when viewed from above, so that they lie in a common vertical plane.

9. A system for transporting coat hangers as defined in claim 1, including a singler for transporting coat hangers, as seen in the direction of transport.

10. A system for transporting coat hangers as defined in claim 1, wherein, as regarded in the direction of transport, said slide pole has a free rear end, which is disposed directly adjacent the front end of said conveyor screw.

11. A system for transporting coat hangers as defined in claim 1, wherein said slide pole has a top side, which is delimited by longitudinal upper edges, said longitudinal upper edges being provided with a chamfer in the transition region leading to said conveyor screw, such that the transfer of the hook coat hangers from said conveyor screw to said slide pole is smooth and continuous.

12. A system for transporting coat hangers as defined in claim 1, wherein, between said opening and said free end of said slide pole, the latter has a longitudinal bore whose center axis coincides with said longitudinal axis.

13. A system for transporting coat hangers as defined in claim 1, wherein a longitudinal bore is in the form of a bearing seating for antifriction bearings disposed at least in part of the region between said free end and said window-like opening.

14. A system for transporting coat hangers as defined in claim 13, wherein said bearing seating is designed for a force fit.

15. A system for transporting coat hangers as defined in claim 13, wherein a drive shaft with antifriction bearings is mounted for rotation in said bearing seating.

16. A system for transporting coat hangers as defined in claim 15, wherein said drive shaft has at the free ends thereof a first universal joint system and a second universal joint system, which universal joint system is mounted with its free joint end in said window-like opening and projects from said slide pole.

17. A system for transporting coat hangers as defined in claim 16, wherein said second universal joint system is connected to an adapter pole, which is mounted in the interior of said conveyor screw and is non-rotatably connected thereto.

18. A system for transporting coat hangers as defined in claim 16, wherein said first universal joint system, said drive shaft, said second universal joint system, and said adapter pole form a drive transmission unit which is connected to a flexible shaft in the region of the free joint end of said universal joint system.

19. A system for transporting coat hangers as defined in claim 18, wherein said flexible shaft is mounted and guided for rotation in a curved rigid sleeve.

20. A system for transporting coat hangers as defined in claim 18, wherein said flexible shaft is coupled, during assembly, via its first end to said free end of said universal joint system and is connected via its second free end to a drive motor.

21. A system according to claim 1, wherein said driving system includes a flexible shaft connected to said drive transmission unit to provide a drive line, said drive line extending at a curved or angled relationship to said longitudinal axis.

22. A system for transporting coat hangers as defined in claim 21, wherein said drive line of said conveyor screw is arranged in space in such a manner that all hook coat hangers to be transported, with their different hook arch geometries and different hanger geometries, can be freely moved in the direction of transport.

23. A system for transporting coat hangers as defined in claim 22, wherein the course of said drive line lies outside the slide pole and outside an envelope horizon of all coat hangers to be transported.

* * * * *